Dec. 19, 1967     L. S. HENDERSON     3,359,464
SWITCH ACTUATING MECHANISM
Original Filed July 14, 1964     2 Sheets-Sheet 1
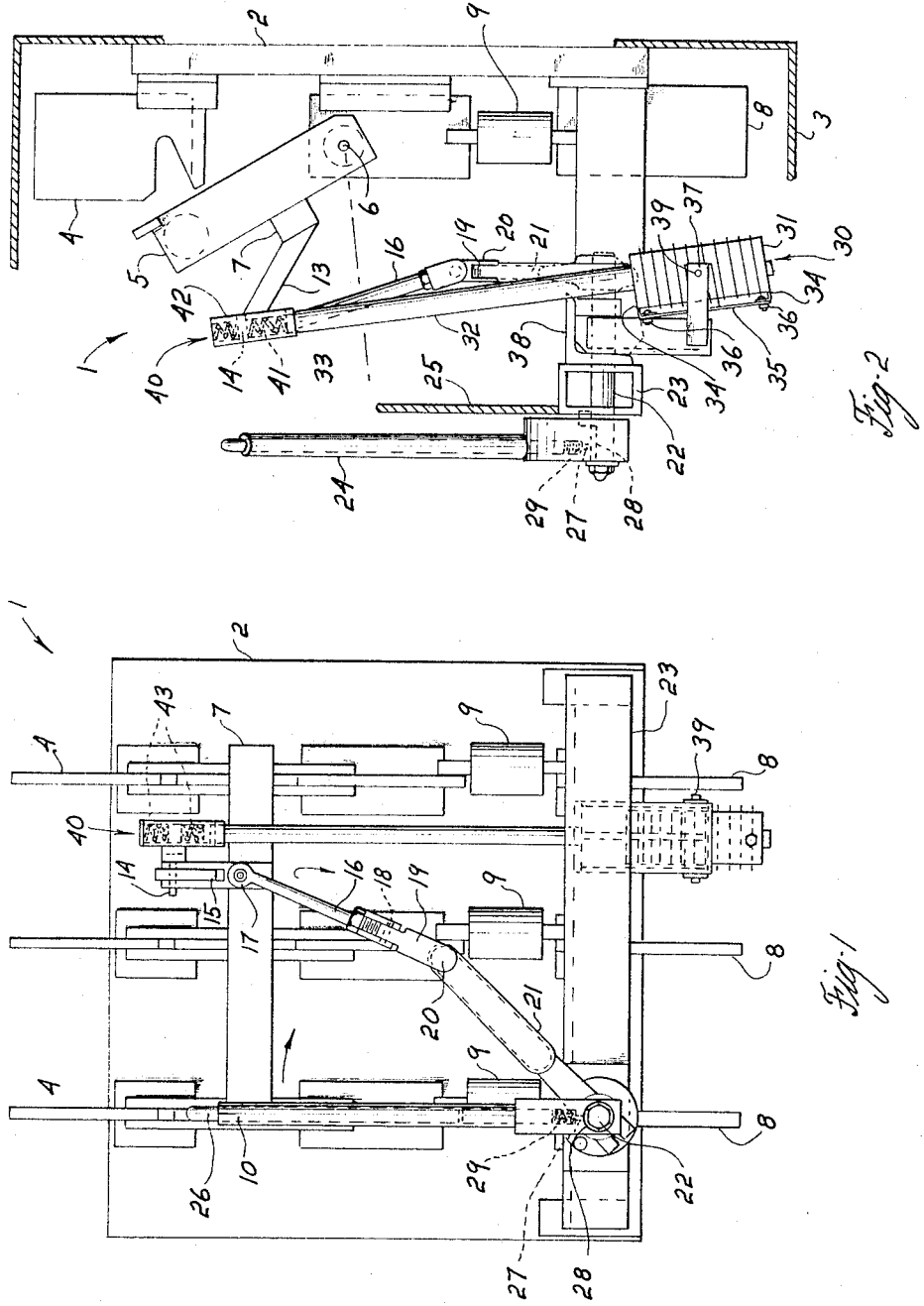
INVENTOR.
Louis S. Henderson
BY
Symestvedt & Lechner
ATTORNEYS

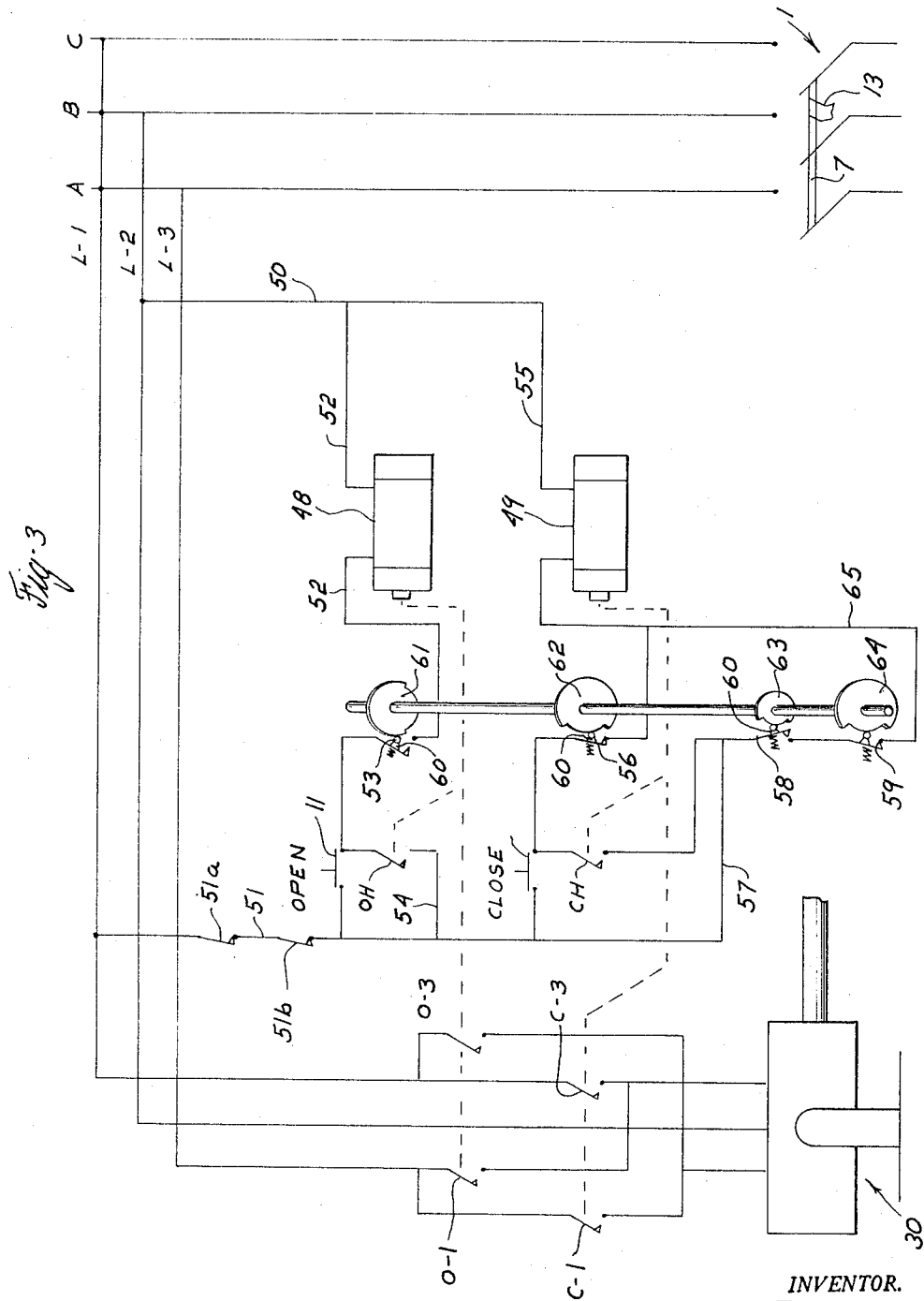

3,359,464
SWITCH ACTUATING MECHANISM
Louis S. Henderson, Lafayette Hill, Pa., assignor to The Pringle Electrical Manufacturing Company, Fort Washington, Pa., a corporation of Pennsylvania
Continuation of abandoned application Ser. No. 382,558, July 14, 1964. This application Feb. 6, 1967, Ser. No. 614,309
8 Claims. (Cl. 317—123)

ABSTRACT OF THE DISCLOSURE

Mechanical and electrical means for actuating an electrical line switch are disclosed. The switch is controlled electrically by a linear actuator which is pivotally mounted for rocking movement on an axis parallel to the axis of the rotation of the blade of the switch. An operator engageable clutch ordinarily disables the manual mechanical actuating means. A braking circuit for the linear actuator is also provided.

---

This application is a continuation of my co-pending application Ser. No. 382,558, filed July 14, 1964, now abandoned. This application discloses and claims only subject matter disclosed in said co-pending application Ser. No. 382,558.

This invention relates to electrical switches and more particularly to an actuating mechanism for opening and closing a switch.

Switches of the type disclosed herein are generally used to connect the electrical system of a building with the main power transmission lines and the present invention is directed towards providing an improved actuating means for such a switch.

These switches are located at the point where the power lines enter a building and in some instances are even located outside of a building. The switches are usually located in places remote from the main-stream of activity in a plant, office building, or apartment and so it is desirable, and in many instances required by local safety codes, to provide them with remotely controlled operating means so that they can be operated from a more convenient location if an emergency arises. Since they are essentially emergency switches any operating means must be absolutely dependable, even when it has not been used for months or even years.

In addition, electrical line switches are quite often large, especially when they are designed to carry the power requirements of large commercial or industrial establishments and, for this reason, automatic operating means are also desirable for ease of operation.

Heretofore, high torque electric motors have been the only practical electrical operating means which have had the necessary dependability and power output to fill these needs. However, such motors, and the circuitry and equipment necessary to operate them, are relatively complex and expensive attachments and in many instances, their cost may exceed that of the switch itself.

With the foregoing in view, it is an object of the present invention to provide a simple, inexpensive and dependable actuating mechanism for remotely controlling an electrical line switch.

A more specific object of the invention is the provision of a linear induction motor as a line switch actuator.

Other objects and advantages of this invention will become more fully apparent from the following description and the accompanying drawings in which:

FIGURE 1 is a front view of a switch actuating mechanism constructed in accordance with the present invention;

FIGURE 2 is a side view of the switch of FIGURE 1, modified to show the position of the parts when the switch is partially opened;

FIGURE 3 is a schematic view of a preferred circuit for controlling operation of the switch of FIGURE 1.

In accordance with the illustrative form of the invention, a line switch 1, of the type used for supplying three phase current to a building, is shown in FIGURES 1 and 2. Switch 1 is mounted on a support 2, made of asbestos or other suitable insulating material. The support 2 may be enclosed within or form part of a cabinet, partially shown in FIGURE 2 at 3 to protect the switch and its actuating mechanism from dirt and moisture and to protect personnel from exposure to electrically live parts.

The switch shown in the drawings is of conventional construction and has an input consisting of line bars 4 mounted on the support 2 in a familiar manner. Switch closure members such as blades 5, each pivotally mounted by any suitable means such as pins 6, are secured together by a horizontal bar 7 for conjoint movement about the pivots 6. Blades 5 are interconnected with load terminals 8 by means of fuses 9.

Opening and closing of the switch is accomplished according to the invention either manually at the switch by means of an operating lever 10, or automatically, by means of push buttons 11 and 12 shown in FIGURE 3, which may be located at any convenient control point. The mechanism provided to control manual operation will now be described.

Switch 1 is provided with a switch operating arm 13, secured to the horizontal bar 7 and extending angularly upwardly, as is best shown in FIGURE 2. Arm 13 has a rod or pin 14 mounted at its upper end. A bifurcated connecting link 15 is pivotally connected to the pin 14 for rocking movement with respect to arm 13 and at its opposite end, is pivotally connected to a link 16, by means such as a pin 17. Link 16 is free to rotate about the pin 17, which is oriented in a plane normal to the axis of the pin 14.

A pin 18 pivotally interconnects the link 16 with a link 19. The link 19 is in turn connected by a pin 20 to a lever 21 which lever is fixed for rocking movement on a shaft 22, which is journalled in a bearing 23 and extends outside of the control box sufficiently far enough to support the actuating handle 10, free and clear of the cabinet door 25.

The actuating handle 24 is provided with a simple clutch mechanism so that it may be selectively engaged with the shaft 22. In the preferred embodiment the clutch consists of a push button 26 which is operated by the thumb or finger to move a rod 27 into engagement with a spline or groove 28 on shaft 22. A coil spring 29 maintains the rod 27 in raised position out of engagement with the groove in shaft 22, when the button is not depressed by the operator.

Manual operation of the switch by the mechanism just described is accomplished as follows: Button 26 is depressed to engage the rod 27 with groove 28. The handle 10 is rotated 90° in a clockwise direction as viewed in FIGURE 1. This causes clockwise movement of lever 21, and this movement is translated to the switch opening lever 13 through links 19, 16 and 15 to cause the switch to open. The linkage described provides a convenient and effective means for converting rotary movement in one plane to rotary movement in a plane perpendicular thereto without undue stress on any of the parts.

To electrically actuate switch 1, I provide a linearly operable induction motor 30. This device, as opposed to a solenoid, has a particularly long actuating stroke. It is an A-C device and has a series of coils 31, which, in the preferred embodiment, are connected to the line side of the three phase power supply, although a single phase supply could be used. A sweeping magnetic field is produced along the length of the block of stator coils and induces linear motion in an actuator rod 32. Actuating rod 32 is slidably mounted within the coils 31 and has a stroke length sufficient to move switch arm 13 between the position in which the switch is fully closed and that shown in dot-dash lines at 33, when a magnetic field is produced in the coils 31.

Induction motor 30 is mounted on legs 34 which are fastened to a frame 35 by any suitable means such as machine screws or rivets 36. Frame 35 has a pair of arms 36 located at about its midpoint. These arms are pivotally mounted on an aligned pair of arms 37, rigidly mounted on an angle 38 secured to the box-channel 23. Pins 39 pass through aligned openings in each pair of arms 36, 37 so that the entire actuator is free to pivot about the axis of the pins.

In order to prevent undue wear and possible damage to the mechanism, actuator rod 32 is connected to the switch arm 13 by means of a lost motion connection or coupling generally designated by the number 40. The coupling includes the pin 14 secured to the switch arm 13, and the pin is mounted for movement within a slot 41 in a barrel-like body member 42 secured to the end of the actuating rod 32. Coil springs 43 are mounted within the barrel 42 on opposite sides of the pin 14. The springs hold the pin in mid-position within slot 41, and comprise a shock absorbing means whenever the actuator rod 32 begins its movement.

The pivotal mounting of the linear motor 30 and the lost motion coupling 40 are particularly important features of the invention so far described. When the switch is opened electrically, straight line motion of the actuator rod 32 is converted to rotary motion of the switch with a minimum of stress and strain on the moving parts. The pivotal mounting provides a simple means of insuring that the actuator always operates in a straight line, making it possible to utilize a long stroke device of the type referred to herein. During operation by this actuator, it should be noted in passing that manual operating handle 10 remains stationary since the clutch rod 27 is held in its retracted position out of engagement with shaft 22 by means of the spring 29.

Turning now to FIGURE 3, I have illustrated therein a preferred form of the circuit necessary to operate my improved switch mechanism. In the diagram, switch 1 is located between the line and load side of a typical 220 volt, three phase, 60 cycle, power supply.

For purposes of the explanation that follows, the switch 1 is shown in its open position. Linear motor 30 is connected to the line side of the power supply through lines L-1, L-2 and L-3 through relay contacts O-1, O-3, C-1 and C-3 all of which are normally in the open position. A pair of relay coils 48 and 49 control the "O" and "C" contacts respectively. Contacts O-1 and O-3 close to energize the actuator 30 in a direction to open switch 1 while contacts C-1 and C-3 close to reverse the polarity of the actuator to thereby close the switch. The relays 48 and 49 are connected in parallel with each other between the lines L-1 and L-2 through leads 50 and 51, the relay coil 48 being connected through line L-2, lead 50, lead 52, through a cam operated switch 53 and the button-operated control switch 11. A hold circuit for the relay 48 consists of a lead 54 and a relay-operated contact OH. Normally closed switches 51a and 51b are controlled by the door 25 and the handle 10, respectively, and open to prevent electrical actuation when the door is opened or handle 10 is operated.

In like manner, relay coil 49 is connected between L-1 and L-2 by lead 50, a lead 55, a cam-operated limit switch 56, and the button-operated switch 12 labeled "Close" in the drawing, and the line 51. A hold circuit for relay 49 comprises line 57, cam-operated limit switch 58 and relay controlled contact CH.

The aforementioned cam-operated switches 53, 56, 58 and a limit switch 59 are each controlled by followers 60 which are spring urged into engagement with the periphery of one of a plurality of cams 61–64. While four cams are shown in the preferred embodiment, it should be apparent that fewer cams, having several independent control surfaces, would suffice, and that a separate cam for each switch is shown primarily for clarity of illustration. Each of these cams 61–64 is mounted on the shaft 22 or some other part of the motion transmission mechanism for conjoint rotation.

It should be remembered that shaft 22 is connected with the main switch 1 through switch arm 13 and links 15, 16, 19 and 21, and thus will rotate with the switch. When the switch is in the open position, the cams are in the position illustrated in FIGURE 3. In order to close the line switch, the operator depresses the close button 12, completing a circuit through line 60, the relay 49, normally closed limit switch 56, the close button 12 and line 51 to line L-1. The relay 49 is energized closing contacts CH to lock itself in through line 57, the upper contacts of limit switch 58 and contacts CH. When the relay 49 is energized, contacts C-1 and C-3 are also closed and three phase current is supplied to the linear induction motor. Actuator rod 32 then moves to the right as shown in FIGURE 3 and the power switch closes. When the switch 1 is closed, cams 61–64 have rotated in a clockwise direction to a position in which switch 56 and the upper contacts of switch 58 are opened to de-energize relay 49, switch 53 is closed and 59 is opened. The purpose of switches 53 and 59 will become apparent in the description which now follows:

To open the switch 1, open button 11 is depressed which completes a circuit from line L-2 through line 50, line 52, the relay 48, switch 53, the contacts of the open button, and the line 51 to line L-1. Relay 48 is now energized and closes its contacts OH so that the relay is locked in after button 11 is released. At the same time, the relay causes contacts O-1 and O-3 to close so that L-1, L-2 and L-3 are connected to the linear motor 30 in the reverse sequence from the sequence of connection when the close button is depressed. The switch 1 now begins to open. Shortly before it reaches the fully open position shown in dot-dashed lines at 33 in FIGURE 2, switch 53 is opened by the cam 61, breaking the circuit to the relay 48, so that the relay is de-energized and contacts O-1 and O-3 open. At the same instant, switch 59, previously held in the open position by the cam 64, is closed. Cam 63 has a longer dwell than cam 64 so that the lower contact of the switch 58 is still closed at this point and a circuit is completed through line 51, line 57, the lower contact of switch 58, the switch 59 and line 65 to the relay 49. Relay 49 is energized to close its contacts C-1 and C-3 and the linear motor is energized in the reverse direction so that braking force is applied to the actuator and the main power switch. An instant later when the switch is fully open, switch 59 and the lower contacts of 58 open to break the cricuit to the relay 49. The relay 49 is de-energized and the contacts C-1 and C-3 open.

The arrangement just described provides a remarkably effective means of electrically or manually controlling a heavy duty electrical line switch. The mechanism is simple, compact and durable and may be operated from a control station remote from the point of service entry into the building.

I claim:

1. In combination with an electrical switch having at least one movable contact member, said member being pivotally mounted for movement between open and closed positions, the improvement comprising: a linear induction motor having electromagnetic stator coils and a magnetic rod, said rod being linearly movable in response to sequential energizing of said coils, means pivotally mounting said motor for rocking movement about an axis parallel to the axis of rotation of said contact member, coupling means pivotally connecting said rod to said member at a point on said member spaced from said pivot axis, and control means selectively operable to energize said coils in sequence to move said rod to rotate said contact member to switch opening position.

2. Apparatus according to claim 1, wherein said control means further includes means for energizing said coils in a second sequence to move said rod to rotate said contact member to switch closing position.

3. Apparatus according to claim 1, further including a manually controllable lever for opening and closing said switch, motion transmitting mechanism intermediate said lever and said coupling means, and means normally disconnecting said lever from said motion transmitting mechanism to prevent movement of said lever during electrical operation of said switch.

4. Apparatus according to claim 1, wherein said coupling means includes a lost motion connection between said rod and said movable contact member.

5. Apparatus according to claim 4, wherein said connection includes a laterally projecting pin mounted on said contact member, a barrel-like member secured to said actuating rod, and a slot in said barrel, said pin being resiliently mounted within said slot.

6. Apparatus according to claim 2, wherein said control means includes a first control relay and a first set of relay controlled contacts for effecting sequential energizing of said coils in a sequence to open said switch, a second control relay and a second set of relay controlled contacts for energizing said coils in a sequence to close said switch.

7. Apparatus according to claim 6, wherein said control means includes means to momentarily energize said second control relay subsequent to energizing of said first control relay, to apply braking force to said actuator.

8. Apparatus according to claim 2, wherein said control means includes a first control relay and a first set of relay controlled contacts for effecting sequential energizing of said coils in a sequence to close said switch, a second control relay and a second set of relay controlled contacts for energizing said coils in a sequence to open the switch, cam means mounted for conjoint movement with said motion transmitting mechanism, switch members operable by said cam means when said switch is opened a predetermined amount to de-energize said first control relay and to momentarily energize said second control relay, to apply braking force to the actuator.

References Cited

UNITED STATES PATENTS

| 2,508,167 | 5/1950 | Jones | 318—135 X |
| 3,246,100 | 4/1966 | Russell | 200—50 X |

MILTON O. HIRSHFIELD, *Primary Examiner.*

J. A. SILVERMAN, *Assistant Examiner.*